United States Patent
Ecker et al.

(10) Patent No.: US 10,071,659 B2
(45) Date of Patent: Sep. 11, 2018

(54) VEHICLE SEAT AND METHOD FOR STOWING A SEAT ELEMENT

(71) Applicant: Johnson Controls Components GmbH & Co. KG, Kaiserslautern (DE)

(72) Inventors: Roman Ecker, Trippstadt (DE); Dirk Dubois, Hinterweidenthal (DE); Jürgen Naßhan, Kaiserslautern (DE)

(73) Assignee: JOHNSON CONTROLS COMPONENTS GMBH & CO. KG, Kaiserslautern (DE)

( * ) Notice: Subject to any disclaimer, the term of this patent is extended or adjusted under 35 U.S.C. 154(b) by 65 days.

(21) Appl. No.: 15/105,901

(22) PCT Filed: Nov. 27, 2014

(86) PCT No.: PCT/EP2014/075727
§ 371 (c)(1),
(2) Date: Jun. 17, 2016

(87) PCT Pub. No.: WO2015/090884
PCT Pub. Date: Jun. 25, 2015

(65) Prior Publication Data
US 2016/0311347 A1    Oct. 27, 2016

(30) Foreign Application Priority Data

Dec. 18, 2013 (DE) .......... 10 2013 021 076
Feb. 12, 2014 (DE) .......... 10 2014 202 569

(51) Int. Cl.
*B60N 2/30*    (2006.01)

(52) U.S. Cl.
CPC .......... *B60N 2/309* (2013.01); *B60N 2/3009* (2013.01); *B60N 2/3013* (2013.01); *B60N 2/3065* (2013.01); *B60N 2/3093* (2013.01)

(58) Field of Classification Search
CPC .... B60N 2/309; B60N 2/3093; B60N 2/3011; B60N 2/3013; B60N 2/3065
See application file for complete search history.

(56) References Cited

U.S. PATENT DOCUMENTS

| | | | |
|---|---|---|---|
| 6,199,951 B1 | 3/2001 | Zeile et al. | |
| 7,651,166 B2 | 1/2010 | Schwingenschlögel et al. | |
| (Continued) | | | |

FOREIGN PATENT DOCUMENTS

| | | |
|---|---|---|
| DE | 10055205 C2 | 4/2003 |
| DE | 20304713 U1 | 7/2004 |
| (Continued) | | |

OTHER PUBLICATIONS

International Search Report and Written Opinion for international application No. PCT/EP2014/075727 dated Feb. 17, 2015.
(Continued)

*Primary Examiner* — David R Dunn
*Assistant Examiner* — Tania Abraham
(74) *Attorney, Agent, or Firm* — The Dobrusin Law Firm, P.C.

(57) ABSTRACT

The present invention relates to a vehicle seat (1), comprising a seat element (2), which can be height-adjusted from a usage position to a stowing position, and comprising a backrest element (3), wherein the backrest element (3) can be pivoted about a stationary primary axis (A), wherein the backrest element (3) is operatively connected to the seat element (2) by means of an articulated system in such a way that the seat element (2) can be transferred from the usage position to the stowing position by means of a pivoting motion of the backrest element (3), wherein the articulated system has a deflecting element (7), wherein the deflecting element (7) can be pivoted about a stationary secondary axis (B), wherein a secondary plane (B'), which extends perpen-
(Continued)

dicularly to the direction of travel (D) and comprises the secondary axis (B), is arranged in front of a primary plane (A'), which extends perpendicularly to the direction of travel (D) and comprises the primary axis (A), in a direction extending parallel to the direction of travel (D).

12 Claims, 2 Drawing Sheets

(56) References Cited

U.S. PATENT DOCUMENTS

| | | | | |
|---|---|---|---|---|
| 8,016,341 B2 * | 9/2011 | Duchateau | ............ | B60N 2/3011 296/65.16 |
| 8,931,844 B2 | 1/2015 | Line et al. | | |
| 2005/0269830 A1 * | 12/2005 | Epaud | .................. | B60N 2/3009 296/65.09 |
| 2012/0056459 A1 | 3/2012 | Harden | | |

FOREIGN PATENT DOCUMENTS

| | | | | |
|---|---|---|---|---|
| DE | 102006004497 A1 | 8/2007 | | |
| DE | 102004057471 B4 | 9/2010 | | |
| DE | 202013102633 U1 | 11/2013 | | |
| EP | 1193112 A2 * | 4/2002 | ........... | B60N 2/3013 |
| EP | 1964712 A1 * | 9/2008 | ........... | B60N 2/3011 |
| JP | 2005280679 A | 10/2005 | | |
| WO | 9908894 A1 | 2/1999 | | |

OTHER PUBLICATIONS

Chinese Examination Report for Chinese Application No. 201480068969.0, dated Apr. 28, 2017.

* cited by examiner

VEHICLE SEAT AND METHOD FOR STOWING A SEAT ELEMENT

PRIOR ART

The invention relates to a vehicle seat having a vertically adjustable seat element, and to a method for stowing a vehicle seat having a vertically adjustable seat element.

Vehicle seats having a vertically adjustable seat element are known and are arranged, for example, in motor vehicles. In order to increase a storage space in the motor vehicle, the vehicle seats are intended to be able to take up a stowage configuration. It is particularly desirable here for the vehicle seat stowed in the stowage configuration to adjoin the storage space in as flush a manner as possible and therefore a common storage surface is realized. In order to realize such a stowage configuration, it is provided in the prior art that a vertically adjustable seat element is pressed downward and a backrest element coupled to the seat element is pivoted onto the seat element. For this purpose, a multiplicity of maneuvers are generally required. Furthermore, backrest element and seat element are typically connected to each other via an activation coupling. The latter disadvantageously leads to slits in the backrest pad and to it not being possible to arrange a rectilinear gear rod between two fittings.

DISCLOSURE OF THE INVENTION

It is an object of the present invention to provide a vehicle seat which is transferable into a stowage configuration in as simple a manner as possible, i.e. with a minimum of maneuvers required. Furthermore, it would be desirable for it to be possible to dispense with an activation coupling in such a vehicle seat. Otherwise, such an activation coupling would result in slits in an upholstery of the vehicle seat or would prevent a rectilinear gear rod from being able to be arranged between two fittings.

The object is achieved by a vehicle seat having a seat element, which is vertically adjustable from a use position into a storage position, and a backrest element, wherein the backrest element is pivotable about a positionally fixed primary axis, wherein the backrest element is operatively connected to the seat element via an articulation system in such a manner that, by means of a pivoting movement of the backrest element, the seat element is transferable from the use position into the storage position, wherein the articulation system has a deflection element, wherein the deflection system is pivotable about a positionally fixed secondary axis, wherein a secondary plane, which runs perpendicularly to the direction of travel and comprises the secondary axis, is arranged in a direction running parallel to a direction of travel in front of a primary plane, which runs perpendicularly to the direction of travel and comprises the primary axis.

In this case, by means of the relative arrangement of the secondary plane with respect to the primary plane, in particular the secondary axis with respect to the primary axis, a transfer of the entire vehicle seat into the stowage configuration in a particularly easy manner in comparison to the prior art can be realized. The primary axis is arranged here above the secondary axis. In particular, the entire vehicle seat can be transferred into the stowage configuration by means of single-handed operation. The articulation system should preferably be understood as a flow-of-force means, wherein the articulation element uses a force, which is applied during the pivoting of the backrest element, in order to adjust the seat element vertically. The deflection element is advantageously configured here in such a manner that, by means of the arrangement of the primary axis and the secondary axis, a lever effect can advantageously be used during the actuation of the deflection system. The backrest element and/or the seat element preferably has/have upholstery. By means of the vehicle seats according to the invention, it is furthermore possible in an advantageous manner to realize particularly small block dimensions. In addition, it is advantageously possible here to dispense with slits in the upholstery.

It is preferably provided here that, in the storage position, the seat element is arranged offset rearward in the direction of travel in relation to the use position. That is to say, during the transfer from the use position into the storage position, the seat element is drawn, in particular pivoted, in an opposed manner to the direction of travel and therefore in the direction of the backrest element. As a result, for example, the space below the backrest element can be used in an advantageous manner for stowing the seat element, and therefore the vehicle seat as a whole can be stowed in the storage position in a manner particularly saving on construction space. Furthermore, it is provided that the deflection element is arranged in such a manner that, during the transfer of the seat element from the use position into the storage position, the deflection element is rotated in the clockwise direction. The deflection element in the storage position is preferably rotated by more than 45°, preferably by more than 90° and particularly preferably by more than 120° in relation to the deflection element in the use position.

Furthermore, it is provided that the deflection element comprises a first coupling point and a second coupling point, wherein the deflection element is coupled, preferably indirectly, to the backrest element via the first coupling point and to the seat element via the second coupling point. It is preferably provided here that, in the storage position, the first coupling point is arranged above the second coupling point and, in the use position, the second coupling point is arranged above the first coupling point. Furthermore, it is preferably provided that, in the storage position and the use position, the first coupling point is arranged between the primary plane and the secondary plane, while the second coupling point is arranged spatially in front of the primary plane and the secondary plane in the direction of travel. Furthermore, it is conceivable that, by means of the deflection element, a rear part of the seat element is offset downward during the transition from the use position into the storage position.

Furthermore, it is provided that the primary axis is arranged substantially above the seat element. As a result, the seat element can be configured in such a manner that the seat element can be arranged, for example, at least partially below the backrest element in the storage position. Furthermore, it is provided that the primary axis and the secondary axis are mounted in an integrally configured base part.

Advantageous refinements and developments of the invention can be gathered from the dependent claims and from the description with reference to the drawings.

In a further embodiment of the present invention, it is provided that the vehicle seat has a base part, wherein
  the backrest element is coupled to the base part so as to be pivotable about the positionally fixed primary axis, and
  the deflection element is coupled to the base part so as to be pivotable about the positionally fixed secondary axis. In particular, the base element is arranged on a rail system with which the vehicle seat is displaceable along the direction of travel. A particularly compact design of the vehicle seat is realized by the coupling to a common component, namely the base part, because additional components for the coupling of the deflection element or of the backrest element can be dispensed with.

In a further embodiment, it is provided that the articulation system has a first coupling element and a second coupling element, wherein the first coupling element connects the backrest element and the deflection element to each other, and wherein the second coupling element connects the seat element and the deflection element to each other. In particular, the first coupling element is coupled to the backrest element in such a manner that, when the vehicle seat is pivoted forward, the first coupling element is drawn substantially upward, i.e. upward along a direction running substantially perpendicularly to the direction of travel, whereas, when the vehicle seat is pivoted rearward, said coupling element is drawn substantially downward, i.e. downward along a direction running substantially perpendicular to the direction of travel. Furthermore, the deflection element is configured in such a manner that it converts or transforms a movement of the first coupling element, said movement running substantially perpendicularly to the direction of travel, into a movement of the second coupling element, said movement running substantially parallel to the direction of travel. For this purpose, during the transition from the use position into the storage position or from the storage position into the use position, the deflection element is pivoted about the secondary axis. As a result, an articulation system which is particularly stable, reliable and is adapted in particular to the basic framework of the vehicle seat can be realized.

It is preferably provided here that the first coupling element is coupled to the backrest element at a point which is arranged in the primary plane or in front of the primary plane in the driving direction. Furthermore, it is provided that the first coupling element and the second coupling element are each coupled to the deflection element at the first coupling point and second coupling point.

In a further embodiment of the present invention, it is provided that the secondary plane is arranged more than 5 cm, preferably more than 10 cm and particularly preferably more than 15 cm in front of the primary plane along the direction running parallel to the direction of travel.

In a further embodiment of the present invention, it is provided that the seat element has a seat element carrier, wherein the seat element carrier comprises a guide slot, wherein the seat element carrier is connected to the base part via the guide slot so as to be displaceable with respect to the base part. In particular, it is provided that the guide slot is configured in such a manner that, in comparison to the use position, in the storage position the seat element is tilted or inclined. As a result, it is advantageously possible to define a storage position for the seat element, in which the stowed vehicle seat makes as large a storage space as possible available. Furthermore, the guide slot ensures that, during the transition from the use position into the stowage position (or vice versa), the seat element can be at least partially offset along a direction running substantially parallel to the direction of travel. This is preferably required if the seat element is pivoted during the transition into the storage position.

In a further embodiment, it is provided that the vehicle seat has a link connecting the seat element and the base part, wherein the link is arranged on the seat element so as to be pivotable about a tertiary axis. In particular, it is provided that the second coupling element is connected to the seat element in such a manner that a pivoting movement of the link is initiated or brought about by a movement of the second coupling element, which movement runs substantially parallel to the direction of travel. Furthermore, the link is arranged in such a manner that the movement during the transition from the use position into the storage position is advantageously assisted by gravity. It is conceivable here for the link in the use position to be oriented along a direction running non-perpendicularly to the direction of travel. Furthermore, it is conceivable for the second coupling element to be at least partially arranged between the base part and the link. As a result, the articulation system can be arranged on the vehicle seat in a particularly space-saving manner.

In a further embodiment, it is provided that the deflection element has a first lever arm and a second lever arm, wherein the first lever arm is arranged at an angle about a deflection element angle with respect to the second lever arm, wherein the deflection element angle is between 90° and 180°, preferably 135°. It has surprisingly turned out that, by means of such a geometry, a particularly stable deflection element can be realized for as efficient a transmission of force as possible.

In a farther embodiment, it is provided that the first lever arm is longer than the second lever arm, or vice versa. As a result, the deflection element or the entire articulation system can be adapted in an advantageous manner such that the articulation system can be arranged on the vehicle seat in as space-saving a manner as possible. Furthermore, the transmission of force can thereby advantageously be controlled by the deflection element.

The present invention furthermore relates to a method for stowing a vehicle seat as claimed in one of the preceding claims, wherein pivoting the backrest element about the primary axis causes the deflection element to pivot about the secondary axis.

In a further embodiment, it is provided that the deflection element and the backrest element are pivoted along the same direction of rotation during the transition of the seat element from the use position into the storage position.

Further details, features and advantages of the invention emerge from the drawings and from the description below of preferred embodiments with reference to the drawings. The drawings here merely illustrate illustrative embodiments of the invention than do not restrict the essential concept of the invention.

EMBODIMENTS OF THE INVENTION

In the various figures, identical parts are always provided with the same reference signs and are therefore generally also only named or mentioned once in each case.

Figure 1:
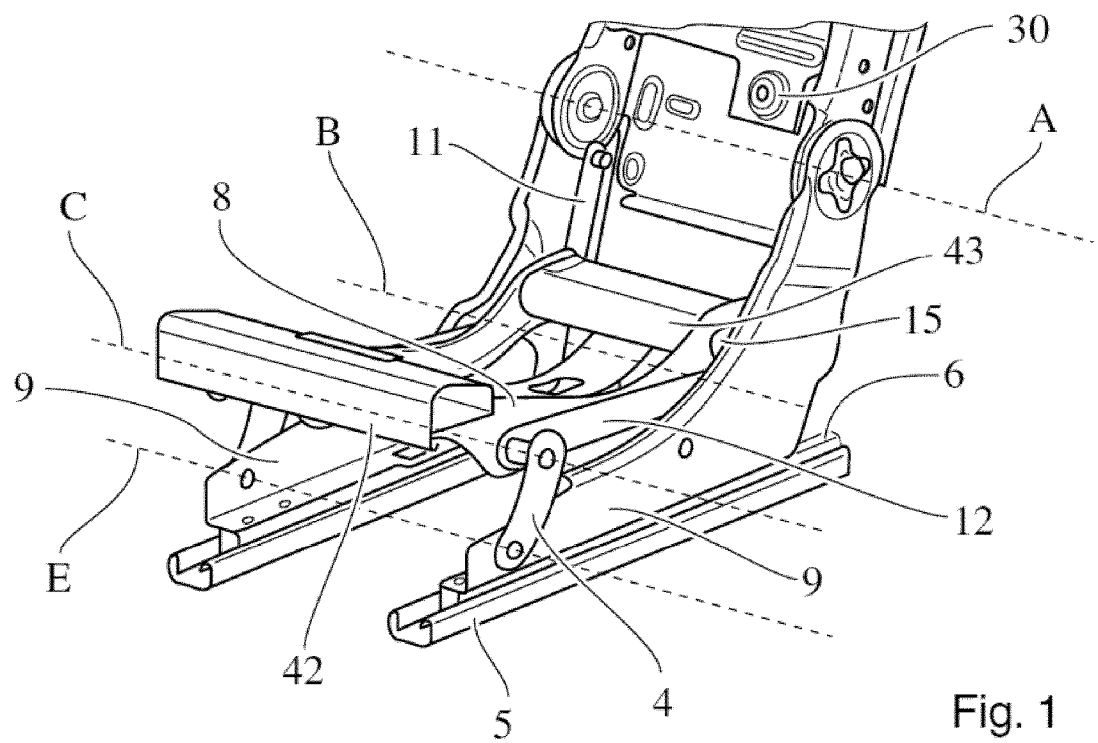
FIG. 1 shows schematically a basic framework of a vehicle seat according to a first illustrative embodiment of the present invention.

FIG. 1 illustrates a basic framework of a vehicle seat 1 according to a first illustrative embodiment of the present invention. A lower basic body together with an upper basic body (not illustrated in FIG. 1) preferably forms the basic framework of the vehicle seat 1. While the upper basic body comprises, for example, a backrest element 3, which is pivotable about a primary axis A, and a head restraint, the lower basic body preferably has a seat element 2 and a rail system. It is conceivable here for the seat element 2 to have a seat element frame and a seat cushion or pad attached to the seat element frame. The rail system preferably comprises an upper and a lower rail element 5 and 6, wherein the upper rail 6 is displaceable along a longitudinal direction of the vehicle relative to the lower rail 5 and is retainable in a retaining position. Furthermore, it is provided that the lower rail 5 is connected rigidly or fixedly to a vehicle body, in particular to a vehicle body floor. As a result, the vehicle seat 1 can be transferred along the longitudinal direction of the vehicle into a desired position. It is furthermore provided that the seat element 2 is vertically adjustable in order to be able to lower the seat element 2 when the latter takes up a storage position. As a result, a stowage configuration of the entire vehicle seat 1 in a manner so as to save as much construction space as possible can thereby be implemented in an advantageous manner. In particular, it is conceivable that, by lowering the seat element 2, as large and as flat a storage surface as possible is formed together with the loading space already present. In order to be able to reversibly transfer the seat element 2 between the storage position and the use position, a seat element carrier 8 of the seat element 2 is connected to a base part 9 of the vehicle seat 1 via a link 4. The link 4 is preferably coupled to the seat element carrier 8, in particular to a front part of the seat element carrier, so as to be pivotable about a tertiary axis C. Direction details, such as, for example, front or rear, relate to a direction of travel defined by the moving vehicle. In particular, it is provided that the link 4 is coupled to the base part 9 so as to be pivotable about a link axis, and the link 4 is pivoted rearward for the transfer from the use position into the storage position. By means of the pivotable coupling of the seat element carrier 8 to the link 4, the pivoting of the link 4 causes the seat element carrier 8 and therefore the seat element 2 to be lowered. Equally, the seat element carrier 8 and therefore the seat element 2 can be raised if the link 4 is pivoted back. In order to pivot the link 4 and therefore in order to lower or raise the seat element 2, the link 4 is connected to a second coupling element 12, which acts as a flow-of-force means. The second coupling element 12 is preferably part of an articulation system by means of which the backrest element 3 and the seat element 2 are operatively connected. The articulation element should preferably be understood as a flow-of-force means for the transmission of a force, which is applied during the pivoting of the backrest element, to the link 4, wherein the flow-of-force means at least partially transmits the applied force to the link 4. For this purpose, the articulation system comprises a first coupling element 11 and a deflection element 7, wherein the first coupling element 11 is coupled pivotably to the backrest element 3. In particular, it is provided that the deflection element 7 converts or transforms a movement of the first coupling element 11, which movement runs substantially perpendicularly to the direction of travel, into a movement of the second coupling element 12, which movement runs substantially parallel to the direction of travel D. The first and the second coupling element 11 and 12 are coupled pivotably to the deflection element 7 in such a manner that, when the backrest element 3 is pivoted forward along a first direction of rotation, the deflection element 7 is equally pivoted along the first direction of rotation. For this purpose, the first coupling element 11 is preferably coupled to the backrest element 2 in such a manner that, during the pivoting forward, the first coupling element 11 is drawn upward. By means of the resultantly brought about pivoting movement of the deflection element 7 counterclockwise, the second coupling element 12 is drawn substantially rearward and therefore the link 4 pivots rearward, as a result of which the seat element 2 is transferred from the use position into the storage position. Furthermore, the basic framework has a second and a third transverse strut 42 and 43, wherein the second and the third transverse strut 42 and 43 connect two seat element carriers 8 to each other along a direction running perpendicularly to the direction of travel D. It is conceivable here for upholstery to be at least partially fastened on the first and/or the second transverse strut. Furthermore, the third transverse strut at least partially encases the first transverse strut. The second transverse strut preferably constitutes a guide slot or a slotted guide mechanism for the first transverse strut. The slotted guide mechanism can advantageously guide the seat element during the transition into the use position, in particular can define an inclination adjustment of the seat element 2 in the storage position. The guide slot is configured here in such a manner that the offset along a direction running parallel to the direction of travel is permitted for the seat element when the link is pivoted. In addition, the backrest element has backrest structural parts which increase the stability of the vehicle seat.

Figure 2:
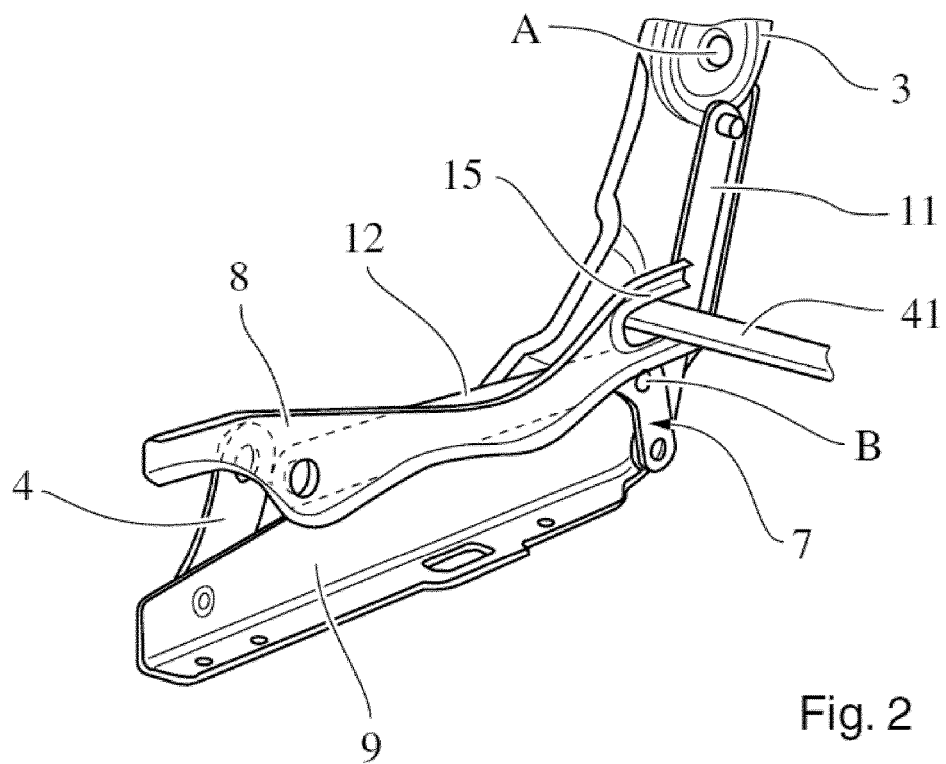
FIG. 2 shows part of the basic framework of the vehicle seat according to the first illustrative embodiment of the present invention in an enlarged schematic illustration.

FIG. 2 illustrates in enlarged form part of the basic framework of the vehicle seat 1 according to the first illustrative embodiment of the present invention. This illustration, which is enlarged in comparison to FIG. 1, illustrates the base part 9 to which the backrest element 3 is coupled so as to be pivotable about the primary axis A, the deflection element 7 is coupled so as to be pivotable about the secondary axis B, and the link 4 is coupled so as to be pivotable about the link axis E. In particular, link 4 and deflection element 7 are arranged on opposite sides of the base part 9. It is preferably provided that part of the articulation system, in particular the second coupling element 12, is at least partially arranged between the seat element carrier 8 and the link 4 along a direction running perpendicularly to the direction of travel D. Furthermore, the seat element carrier 8 comprises a guide slot or a slotted guide mechanism. In particular, the guide slot is guided along a first transverse strut during the transition of the seat element 3 from the use position into the storage position or from the storage position into the use position. It is furthermore conceivable for the seat element carrier 8 to be arranged in the use position on the first transverse strut and thereby to be supported by the latter.

Figure 3:
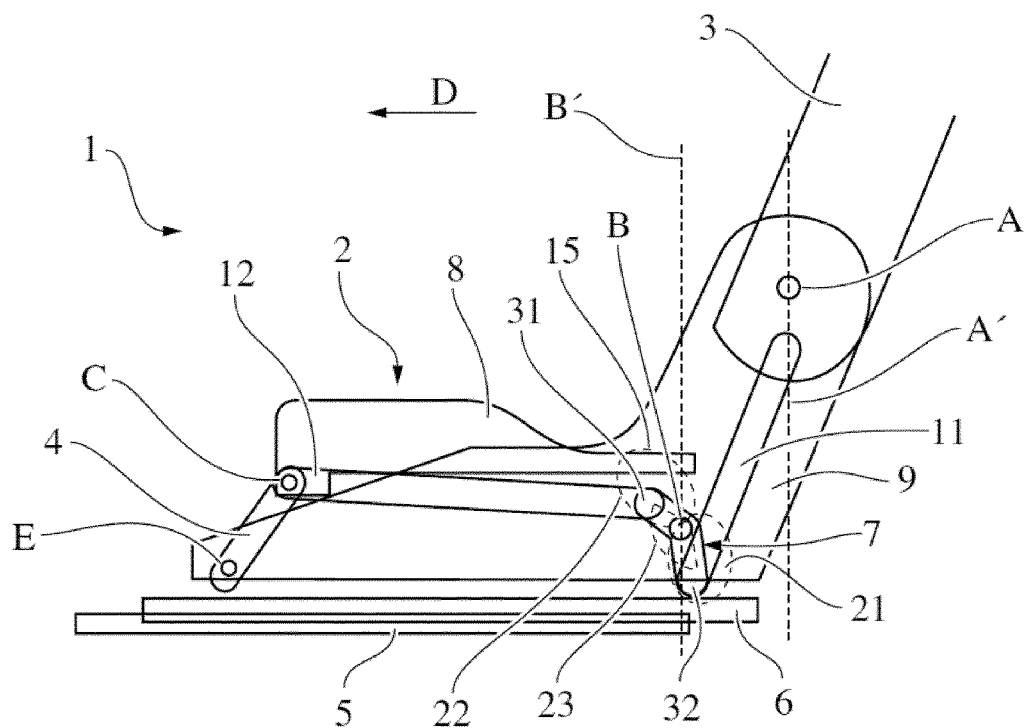
FIG. 3 shows schematically, in a side view, the vehicle seat according to the first illustrative embodiment of the present invention in a use position.

FIG. 3 illustrates schematically, in a side view, the vehicle seat according to the first illustrative embedment of the present invention in a use position. In the use position, the second coupling element 12 is oriented substantially horizontally, i.e. substantially parallel, to the body floor, and the first coupling element 11 is arranged substantially horizontally, i.e. substantially parallel, to the general course of the backrest element 3. The first and the second coupling element 11 and 12 are coupled to the base part 9 via the deflection element 7 so as to be pivotable about the positionally fixed secondary axis. Furthermore, it is provided that the deflection element 7 has a first lever arm 21 and a second lever arm 22. The first lever arm 21 is arranged at an angle to the second lever arm 22, at a deflection element angle 23 of preferably 135°. In particular, it is provided that the secondary axis is arranged in front of the primary axis along the direction of travel. Since the primary axis and the secondary axis are not arranged along direction running parallel to the direction of travel, it is therefore intended in particular that a secondary plane B', which runs perpendicularly to the direction of travel and comprises the secondary axis B, is arranged in the direction of travel in front of a primary plane A', which runs perpendicularly to the direction of travel and comprises the primary axis A. By means of this arrangement, during the transition of the seat element 2 from the use position into the storage position, the lever action by the first lever arm 21 can advantageously be used, as a result of which the transfer of the vehicle seat 1 from the use position into the stowage configuration, preferably by means of single-handed operation, is facilitated. Furthermore, it is provided that a first coupling point 31, at which the first coupling element 11 is coupled to the deflection element is arranged between the primary plane A' and the secondary plane B' along the direction of travel D in the use position. Furthermore, it is provided that a second coupling point 32, at which the second coupling element 12 is coupled to the deflection element 7, is arranged in front of the secondary plane in the direction of travel in the use position. The first coupling point 31 is preferably arranged below the second coupling point 32 in the use position.

Figure 4:
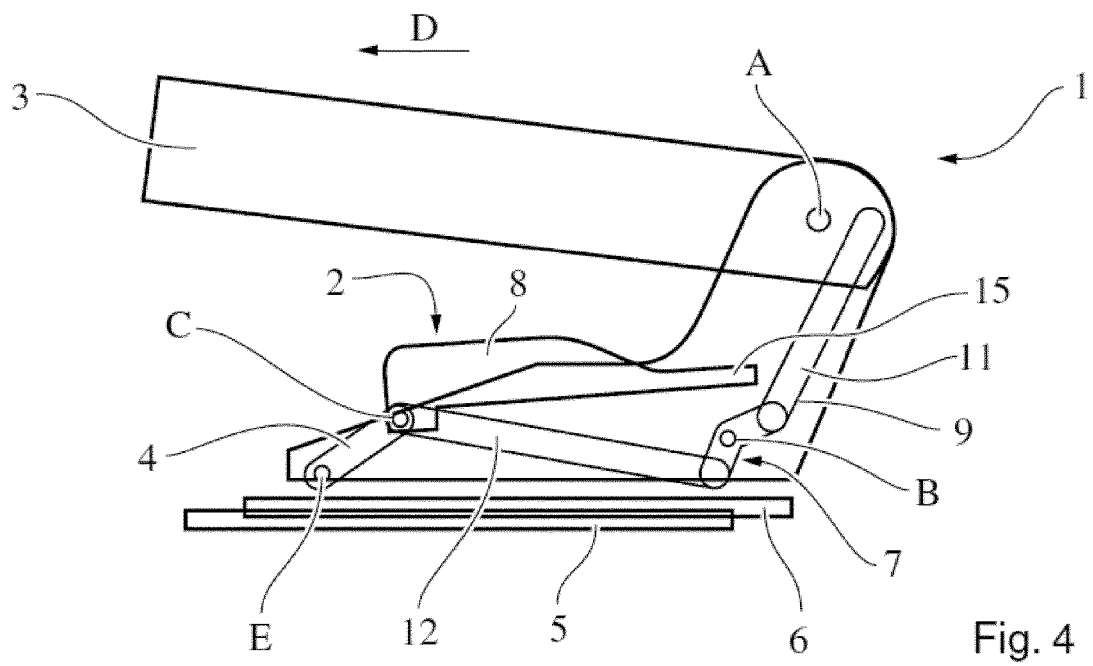
FIG. 4 shows schematically, in a side view, the vehicle seat according to the first illustrative embodiment of the present invention in a storage position.

FIG. 4 illustrates schematically, in a side view, the vehicle seat 1 according to the first illustrative embodiment of the present invention in a use position. It is provided here that, in the storage position, the first coupling point 31 is likewise arranged between the primary plane A' and the secondary plane B' in the direction of travel D, and the second coupling point 32 is arranged in front of the primary plane A' in the direction of travel. In contrast to the use position, in the storage position the first coupling point 31 is preferably arranged above the second coupling point 32. Furthermore, it is provided that, in the storage position, the lowered seat element 2 is tilted in relation to the use position. In particular, the degree of tilting is defined here by the configuration of the guide slot or the slotted guide mechanism 15. Furthermore, the degree of tilting can be selected as far as possible in such a manner that the seat element 2 can be stowed in the storage position in a manner saving as much construction space as possible.

LIST OF REFERENCE SIGNS

1 Vehicle seat
2 Seat element
3 Backrest element
4 link
5 Lower rail
6 Upper rail
7 Deflection element
8 Seat element carrier
9 Base part
11 First coupling element
12 Second coupling element
15 Guide slot,
21 First lever arm
22 Second lever arm
23 Deflection element angle
30 Backrest structural part
31 First coupling point
32 Second coupling point
41 First transverse strut
42 Second transverse strut
43 Third transverse strut
A Primary axis
A' Primary plane
B Secondary axis
B' Secondary plane
C Tertiary axis
D Direction of travel
E Link axis

The invention claimed is:

1. A vehicle seat having a seat element, which is vertically adjustable from a use position into a storage position, and a backrest element, wherein the backrest element is pivotable about a positionally fixed primary axis, wherein the backrest element is operatively connected to the seat element via an articulation system in such a manner that, by means of a pivoting movement of the backrest element, the seat element is transferable from the use position into the storage position, wherein the articulation system has a deflection element, wherein the deflection element is pivotable about a positionally fixed secondary axis, wherein a secondary plane, which is oriented perpendicularly to a direction of travel and comprises the secondary axis, is arranged, in terms of a direction parallel to the direction of travel, in front of a primary plane, which is oriented perpendicularly to the direction of travel and comprises the primary axis, and wherein, in the storage position, the seat element is arranged offset rearward in the direction of travel in relation to the use position, and wherein the deflection element and the backrest element are pivoted along a same direction of rotation during a transition of the seat element from the use position into the storage position.

2. The vehicle seat as claimed in claim 1, wherein the vehicle seat has a base part, wherein the backrest element is coupled to the base part so as to be pivotable about the positionally fixed primary axis, and the deflection element is coupled to the base part so as to be pivotable about the positionally fixed secondary axis.

3. The vehicle seat as claimed in claim 2, wherein the seat element has a seat element carrier, wherein the seat element carrier comprises a guide slot, wherein the seat element carrier is connected to the base part via the guide slot so as to be displaceable with respect to the base part.

4. The vehicle seat as claimed in claim 2, wherein the vehicle seat has a link connecting the seat element and the base part, wherein the link is arranged on the seat element so as to be pivotable about a tertiary axis.

5. The vehicle seat as claimed in claim 1, wherein the articulation system has a first coupling element and a second coupling element, wherein the first coupling element connects the backrest element and the deflection element to each other, and wherein the second coupling element connects the seat element and the deflection element to each other.

6. The vehicle seat as claimed in claim 1, wherein the secondary axis is arranged more than 5 cm in front of the primary axis along the direction parallel to the direction of travel.

7. The vehicle seat as claimed in claim 6, wherein the secondary axis is arranged more than 10 cm in front of the primary axis along the direction parallel to the direction of travel.

8. The vehicle seat as claimed in claim 7, wherein the secondary axis is arranged more than 15 cm in front of the primary axis along the direction parallel to the direction of travel.

9. The vehicle seat as claimed in claim 1, wherein the deflection element has a first lever arm and a second lever arm, wherein the first lever arm is arranged at a deflection element angle with respect to the second lever arm, wherein the deflection element angle is between 90° and 180°.

10. The vehicle seat as claimed in claim 9, wherein the first lever arm is longer than the second lever arm.

11. The vehicle seat as claimed in claim 9, wherein the deflection element angle is about 135°.

12. A method for stowing a vehicle seat as claimed in claim 1, wherein pivoting the backrest element about the primary axis causes the deflection element to pivot about the secondary axis.

* * * * *